INVENTOR.
EARL R. THOMAS

# United States Patent Office 3,453,495
Patented July 1, 1969

3,453,495
REVERSE CURRENT FLOW PROTECTOR FOR ELECTRIC POWER SYSTEMS
Earl R. Thomas, Englewood, N.J., assignor to Consolidated Edison Company of New York, Inc., New York, N.Y., a corporation of New York
Filed Oct. 24, 1965, Ser. No. 504,861
Int. Cl. H02h 3/08
U.S. Cl. 317—26   10 Claims

ABSTRACT OF THE DISCLOSURE

A network protector for permitting current flow from feeder lines to a network energized through a plurality of paths when the voltage on the feeder lines is higher than the network voltage and for preventing current flow in the opposite direction when the network voltage is higher than the voltage of the feeder lines which includes a pair of controlled silicon rectifiers connected oppositely and in parallel between the feeder lines and the network and a variable phase pulse source for supplying the rectifiers with pulses having a predetermined leading variable phase with respect to the feeder line voltage.

---

This invention relates generally to network protectors of the type that are used in power distribution systems utilizing multihigh voltage feeders and transformers to supply a common low voltage network in such manner that power will flow only from the feeders to the network and not from the network to the feeders, and more particularly to an improved network protector utilizing silicon controlled rectifiers and variable phase controlled and width controlled pulses.

In power distribution systems utilizing secondary networks a network protector is inserted between the high voltage transformers and the low voltage network. The network protectors in present use consist of a motor-driven or solenoid-activated multiple switch whose operation is controlled by both voltage and power directional relays which are associated with the network switch. One function of the network protector is to close the network switch when the supply voltage from the high voltage transformer is equal to or slightly higher than the voltage on the network side of the switch and when the supply voltage is essentially in phase with the network voltage. A second function of the network protector is to open the network switch by means of the associated relays when a reversal of power flow occurs with power flowing from the network toward the high voltage transformers. This type of reverse power flow will occur when the high voltage switch at the supply end of the feeder is opened. When this type of reverse power flow occurs it excites the core losses of the transformer as well as the charging current of the high voltage feeder associated with the high voltage transformer. If a fault should develop either in a transformer or an associated feeder, this will also produce a reverse power flow from the network to the feeders and the relays associated with the network switch will again open the circuit.

As is evident from the foregoing the disadvantage of existing network protectors is that they contain moving parts and accordingly require frequent maintenance and are prone to failures. In accordance with the present invention there is provided a static network protector utilizing silicon controlled rectifiers and associated controlled and variable pulses to provide an alternating current switching device which is free of moving parts.

In patent application Ser. No. 482,380 filed on Aug. 25, 1965, and assigned to the same assignee as this patent application, there is described by the inventor Philip A. Philippidis a network protector which contains no moving parts and which has the necessary unidirectional power flow properties in order to function as a network protector. In the Philippidis network protector there is inserted in each phase a pair of unidirectional current flow devices, such as silicon controlled rectifiers, the silicon controlled rectifiers being connected in parallel and in opposition. The silicon controlled rectifiers are triggered on alternate half cycles by associated triggers. The Philippidis network protector also utilizes a phase advance of the triggering pulse and a limitation of the pulse duration. In accordance with one example of the Philippidis network protector the phase advancing of the triggering pulse is achieved by connecting the trigger circuit across two phases of the circuit, and the pulse duration is limited by connecting the trigger circuit to the other or remaining phase of a three-phase power network. The method taught by Philippidis for phase advancing the trigger and for limiting the pulse duration does not permit of any selective phase advancing or pulse duration limitation.

In accordance with the present invention there is provided a network protector which consists of a pair of silicon controlled rectifiers connected in parallel and in opposition but in which the phase advancing of the triggering pulse is achieved by means of a variable phase shifter in order to provide any desired degree of angular advance for proper pulse control of the silicon controlled rectifiers. In addition, the network protector of the present invention utilizes cold cathode gaseous discharge tubes in order to provide a means of varying the angular width of the control or triggering pulses. The utilization of cold cathode gaseous discharge tubes in accordance with the present invention effectively prevents the back feeding of any power through the silicon controlled rectifiers in the angular range from 90 degrees to 270 degrees leading with respect to the phase voltage of the network.

These and further features and objects of the present invention will appear from the following detailed description of several embodiments of the invention to be read in conjunction with the accompanying drawings wherein similar components in the different views are identified by the same reference numeral.

3

Figure 2:
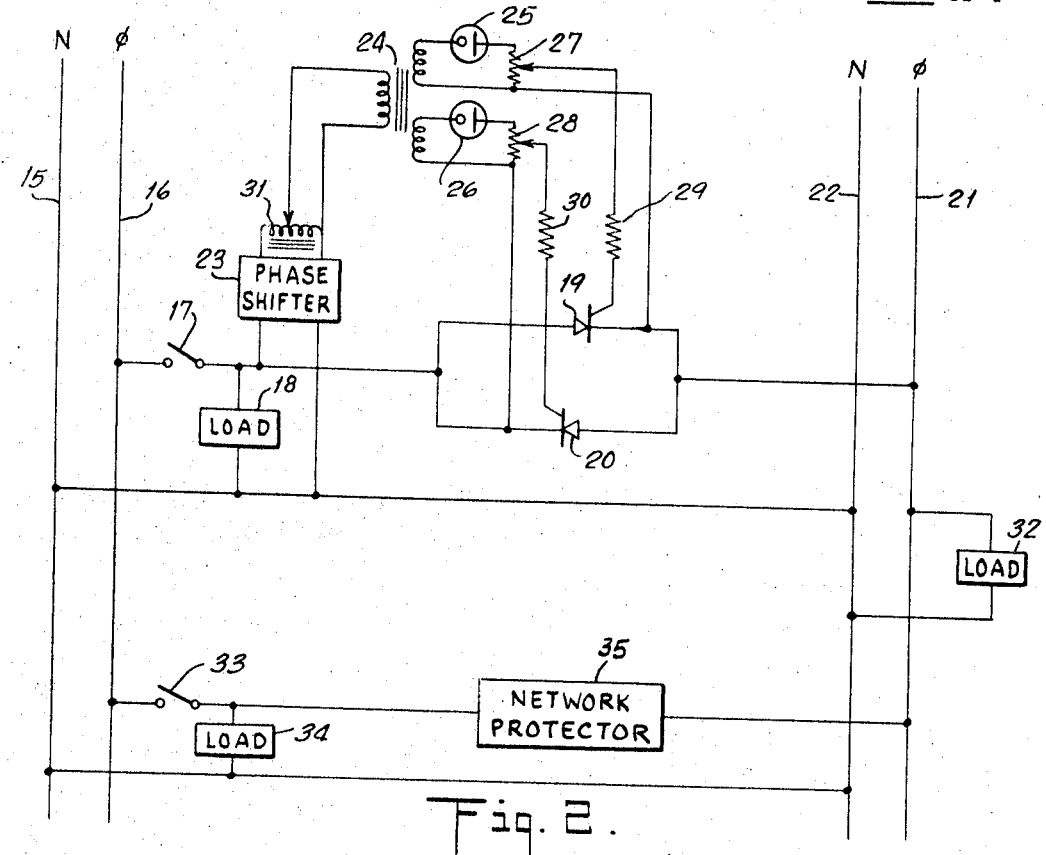
FIGURE 2 is a schematic diagram of on phase of either a single phase or polyphase distribution system utilizing the network protector of the present invention.
Figure 6:
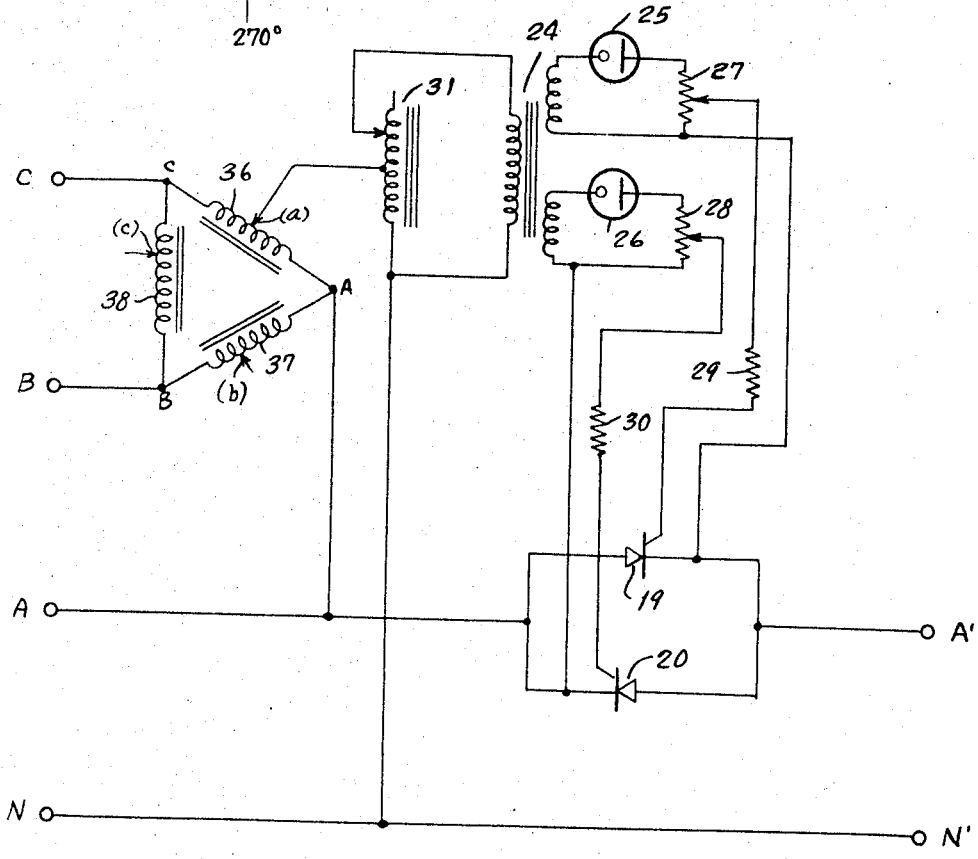
Figure 7:
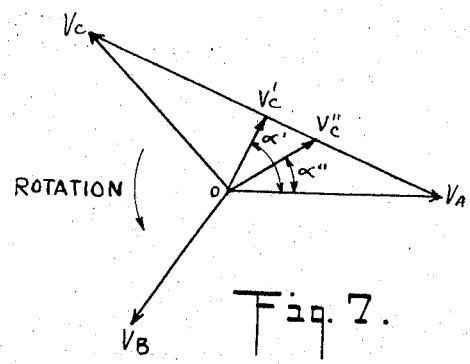
Figure 8:
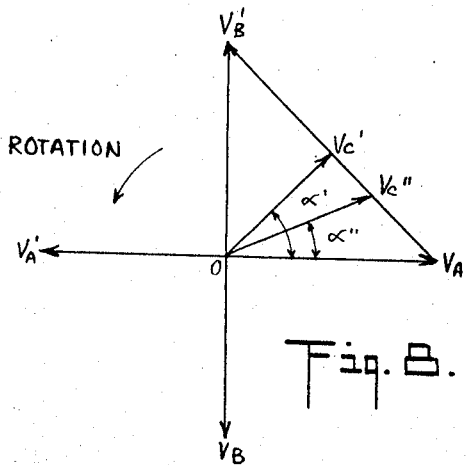
Figure 9:
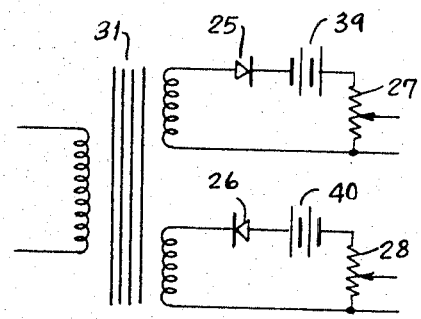
Figure 10:
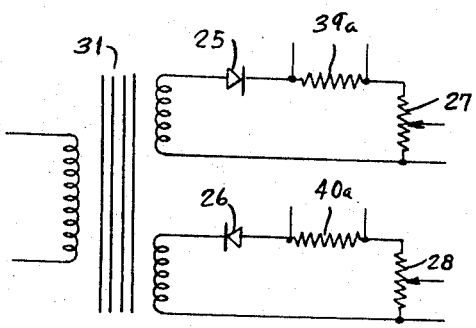
Figure 11:
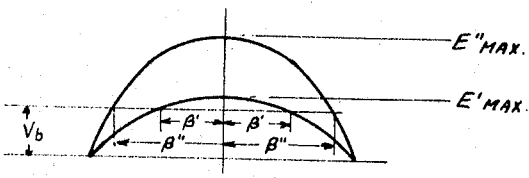

FIGURE 6 is a view similar to FIGURE 2, the phase shifter of FIGURE 2 being replaced by variable auto transformers;

FIGURE 7 is a vector diagram illustrating the phase relationship of the voltages in each phase of the auto transformer of FIGURE 6 and showing the manner of obtaining a phase advance of the triggering pulse;

FIGURE 8 is a vector diagram similar to FIGURE 7 and showing the system as applicable to a two-phase five-wire system in which the variable auto transformer is connected across the line voltage;

FIGURE 9 is a view similar to FIGURES 2 and 6 and showing another embodiment of the invention;

FIGURE 10 is a view similar to FIGURE 9 and showing an isolated direct current supply, and FIGURE 11 is a diagrammatic representation of the operation of the pulse circuits of FIGURES 9 and 10.

Figure 1:
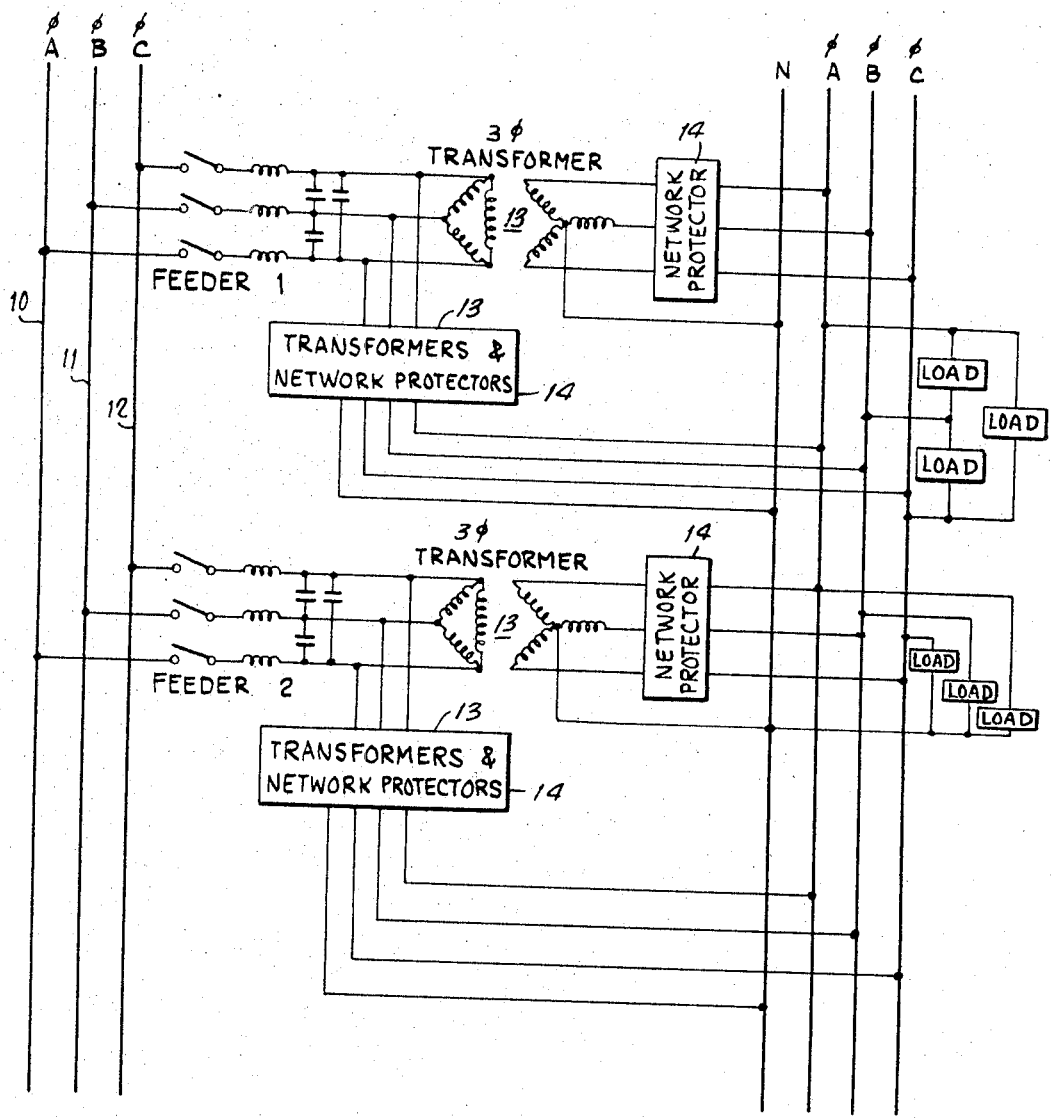
FIGURE 1 is a schematic diagram of a multi-feeder high voltage supply interconnected with a common low voltage network and illustrating the network protector of the present invention as applied to a three-phase distribution system.

Referring now to the figures and particularly to FIGURE 1, there is schematically illustrated by a line diagram a portion of a power distribution system utilizing high voltage feeders and secondary network. The power distribution system illustrated in FIGURE 1 is a three-phase distribution system. The numerals 10, 11 and 12 identify respectively the high voltage supply, the numeral 10 identifying phase A, the numeral 11 identifying phase B, and the numeral 12 identifying phase C. The primary feeders are interconnected to network transformers 13 and network protectors 14. The network is formed by connecting together at each intersection all conductors of each phase. The network protectors 14 are interposed between the transformer 13 and the secondary network. The network protectors 14 permit power to flow to the network and will prevent back-feeding from the network to the feeder when the feeder is switched off.

In FIGURE 2 there is illustrated schematically a form of a single phase network protector in accordance with the present invention. The supply voltage is obtained from a neutral conductor 15 and a phase conductor 16. The switch 17 is equivalent to the feeder supply switch in FIGURE 1 and the load 18 represents the feeder and transformer exitation loads in FIGURE 1. As illustrated in FIGURE 2, the silicon controlled rectifiers 19 and 20 are connected in parallel and in reversed polarity in order to permit alternating current to flow from the supply conductor 16 to conductor 21 of the network when the controlled rectifiers 19 and 20 are in the conduction period.

In order to properly control the flow of current through the silicon controlled rectifiers 19 and 20 in the direction from the supply as indicated by the conductors 15 and 16 to the network as represented by the conductors 21 and 22, and to prevent or cause blocking of current flowing from the network back toward the supply load 18, an adjustable phase shifter 23 is connected across the supply voltage. The purpose of the adjustable or variable phase shifter 23 is to provide a pulse controlled voltage which is advanced in phase rotation direction with respect to the supply voltage over a range of from 30° leading to 60° leading.

The silicon controlled rectifiers 19 and 20 are triggered by a pulse transformer 24. Each silicon controlled rectifier 19 and 20 has connected in series therewith a cold cathode discharge tube 25 or 26, a potentiometer 27 or 28 and a limiting resistor 29 or 30. An adjustable voltage transformer 31 is interposed between the phase shifter 23 and the pulse or trigger transformer 24. The purpose of the adjustable voltage transformer 31 is to supply the pulse transformer 24 through the circuits indicated. The output current pulses from the cold cathode discharge tubes 25 and 26 flow through potentiometers 27 and 28 respectively and provide the gate control pulse voltages for the silicon controlled rectifiers 19 and 20. The resistors 29 and 30 included in the circuit are current limiting resistors.

4

As indicated in FIGURE 2 the polarity of the cold cathode discharge tubes 25 and 26 are so selected and arranged as to produce pulses of opposite polarity and 180 degrees out of phase with respect to each other. The adjustment of the voltage from the variable transformer 31 permits adjustment of the pulse width over a range of approximately 80 electrical degrees to 100 electrical degrees. In FIGURE 2 the load being supplied on the network side is designated by the numeral 32. In order to illustrate the versatility of the system a second feeder is illustrated supplying the network from the common supply conductors 15 and 16, this feeder being interrupted by a switch 33. This circuit has a supply excitation load 34 and a second switchable network protector 35.

Figure 3:
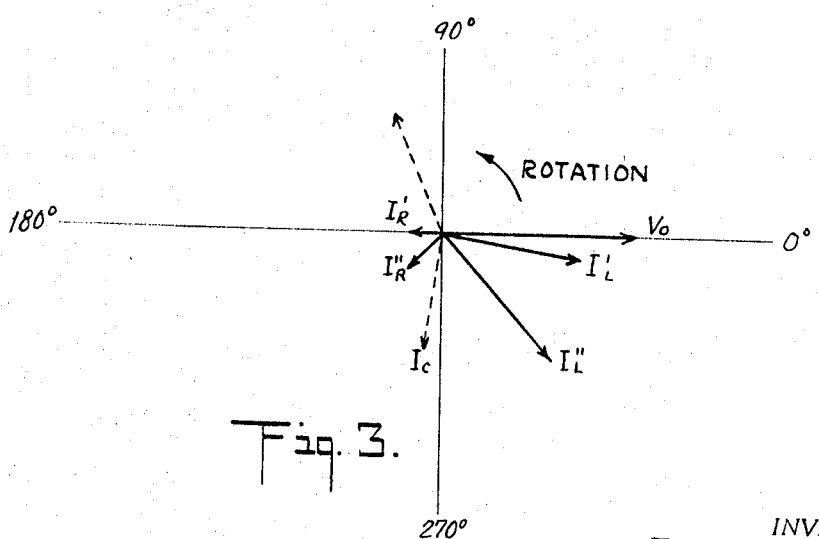
FIGURE 3 is a vector diagram illustrating the voltage and current relationships in a typical power distribution system.

In FIGURE 3 there is indicated in vector form the usual load conditions which exist on an alternating current network, the represenation being for one phase of a polyphase network. In FIGURE 3 the supply voltage is designated $V_O$ and the load current, which is variable in both magnitude and in the phase position, is indicated as $I_L'$ and $I_L''$ and will lag the supply voltage $V_O$ by an amount ranging from a few degrees to approximately 60 degrees. When the supply voltage to a transformer is interrupted at the feeder the power flow reverses and the excitation current taken by the transformer is represented by the vector current $I_X$ and the charging current taken by the feeder, if it is a cable system, is represented by the vector current $I_C$ with the resulting combined feedback current having an angular variation of from $I_{R'}$ to $I_{R''}$.

As is evident from FIGURE 3 in order to have a switching device which performs satisfactorily, it is necessary that forward conduction be maintained with the current load vectors in the angular position of from 300 degrees to 358 degrees while providing blocking of reverse current flow in the angular position of from 90 degrees to 270 degrees. The network protector illustrated in FIGURE 2 provides the desired control in order to obtain this type of switching. The manner in which this is achieved is illustrated in FIGURE 4.

Figure 4:
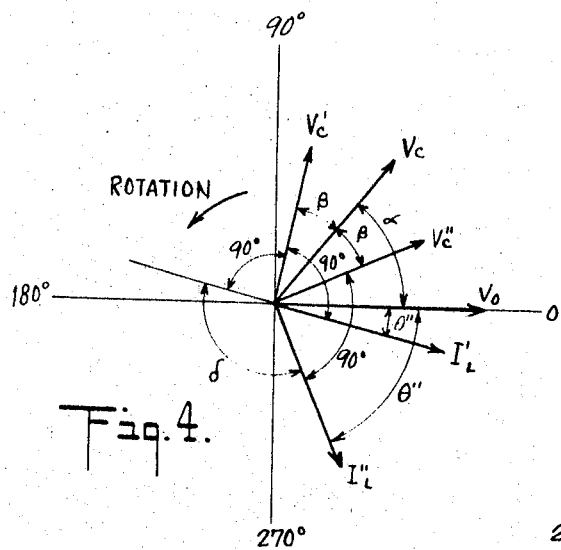
FIGURE 4 is a vector diagram similar to Figure 3 but illustrating the extent to which the control voltage should lead the supply voltage.

In FIGURE 4 the supply voltage is designated $V_O$ while the control voltage is designated $V_C$. It can be seen that the control voltage should lead the supply voltage by an angle $\alpha$. The width of the control pulse will provide a plus or minus angular width B, thereby giving the limits of the control pulse as extending from $V_{C'}$ to $V_{C''}$. The angular position of the control voltage $V_C$ is produced by the phase shifter 23, while the angular width B is produced by proportioning the magnitude of the voltage obtained from the variable transformer 31 to the voltage drop in the cold cathode discharge tubes 25 and 26.

Figure 5:
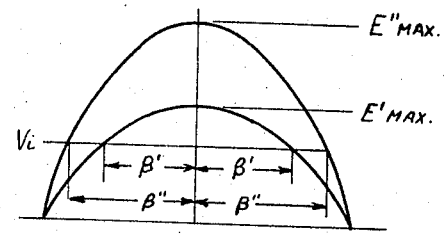
FIGURE 5 is a diagram representing the ignition voltage and voltage drop through the cold cathode discharge tubes of the present invention.

In FIGURE 5 there is represented the ignition voltage and voltage drop through the cold cathode discharge tubes 25 and 26. The two different values of rectified alternating current voltage are shown as $E'_{max.}$ and $E''_{max.}$. Since the voltage drop through a given cold cathode discharge tube remains constant, the magnitude of the applied voltage determines the width of the current pulses as indicated by the designations B' and B''.

In FIGURE 4 the control voltage $V_C$ is indicated as leading the supply voltage $V_O$ by an angle $\alpha$, and the leading lagging edges of the control pulse are identified by the designations $V_{C'}$ and $V_{C''}$. Under these conditions a sinusoidal load current can be carried for any angle of lag with respect to the supply voltage $V_O$ between the angles of lag of $\theta'$ to $\theta''$. This establishes the angular boundary limits for the load current between $I_{L'}$ and $I_{L''}$. These load current boundaries have an angle of lags of ninety (90) degrees from $V_{C'}$ and $V_{C''}$ respectively.

Any reverse power flow due to inductive loads in the angular position between $V_{C'}$ and the vector position 90 degrees leading $V_{C'}$ results in distorted load current pulses due to fractional conduction during parts of each half cycle. In the region from this boundary vector through the leading arc of angle δ to the vector position $I_{L''}$ there is no reverse power flow due to complete cutoff of the silicon controlled rectifiers 19 and 20. Since the supply voltage to the pulsing circuit is being obtained in the reverse power direction from these partial segments of sinusoidal current flow, however, the pulse shape at vector position $V_{C''}$ is one half sinusoidal pulses. These half pulses would result in half voltage being supplied to the phasing and pulsing circuit and would be less than the value required to cause the cold cathode discharge tubes 25 and 26 to ignite and generate control pulses to the gate circuits. Therefore no reverse power will flow beyond vector position $V_{C''}$ and $I_{L''}$. This is indicated in FIGURE 4 as the angle 90° plus the angle δ.

An alternate form of network protector applicable to a three-phase four wire supply voltage is illustrated in FIGURE 6. In this form of network protector instead of using a variable phase shifter on each phase as was done with the network protector illustrated in FIGURE 2, three variable autotransformers are used which are designated respectively by the numerals 36, 37 and 38, and which are connected respectively across the line voltages CA, AB and BC. For the operation of the control pulses for the silicon controlled rectifiers 19 and 20 in phase A a potential (a) is obtained from autotransformer 36 in order to provide a leading voltage with respect to phase A voltage. From FIGURE 7 it can be seen that any voltage point obtained on an auto transformer connected between voltages A and C will furnish a control voltage between this point and the neutral, such as $V_{C'}$ and $V_{C''}$, having the respective leading phase angles referred to the phase A voltage of α' and α''.

In the network protector illustrated in FIGURE 6 a variable autotransformer 31 is provided to supply the pulse transformer 24 and associated cold cathode discharge tubes 25 and 26 in a manner similar to the description given with regard to the network protector illustrated in FIGURE 2. In a similar manner the potential is obtained from autotransformer 37 at point (b) to supply control pulse voltages for silicon controlled rectifiers in phase B, and voltage from point (c) of autotransformer 38 is obtained to supply control pulse voltages to silicon controlled rectifiers in phase C.

In FIGURE 8 there is illustrated another vector diagram for a network protector in which a variable autotransformer is connected across the line voltage so that the control voltage $V_{C'}$ and $V_{C''}$ are obtained with respect to the neutral having angles of lead in the range of from α' to α''. This type of network protector is applicable to a two-phase five wire system.

Another modified form of network protector in accordance with the present invention is illustrated in FIGURE 9. In FIGURE 9 the pulse supply transformer 31 is the same as that illustrated in FIGURE 6. Solid state diode rectifiers 25 and 26 supply half-cycle control pulses, but are biased respectively by battery potential from batteries 39 and 40 respectively, the batteries 39 and 40 having polarities such that they are in the opposite sense in the series circuit and are prevented from discharging by the blocking action of the diodes 25 and 26 respectively.

In FIGURE 10 series resistors 39a and 40a respectively are inserted in the circuit and a separate and isolated DC supply furnishes a drop in potential across these resistors of a polarity in the opposite sense from the pulses being supplied to the diodes 25 and 26 respectively.

The operation of the control pulse circuits illustrated in FIGURES 9 and 10 is depicted in FIGURE 11. The pulse output voltages $E'_{max.}$ and $E''_{max.}$ are obtained from the diode rectifiers but an inverse potential $V_b$ is included in the circuit and the resulting pulse currents flowing through potentiometers 27 and 28 respectively are caused by that potential which exists above the value of $V_b$. This results in providing for variable pulse widths B' and B''. The actual magnitude of the pulse being supplied to the controlled silicon rectifiers 19 and 20 in both FIGURES 2 and 6 is controlled by varying the potentiometers 27 and 28.

What has been described is a solid state network protector which has unidirectional power flow properties and zero feedback. The flexibility of the network protector is achieved by providing a variable phase shifter which provides a pulse controlled voltage which is variable in phase rotation direction with respect to the supply voltage. In addition cold cathode discharge tubes or solid state anode rectifiers with a bias potential are utilized to provide gate controlled pulse voltages to the silicon controlled rectifiers.

What is claimed and desired to be secured by Letters Patent is:

1. A network protector for insertion in an alternating current power distribution system to interconnect a feeder with a network energized through a plurality of paths for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer connected to said feeder for delivering trigger pulses to said switches having a predetermined phase with respect to the voltage on said feeder, said switches being connected in parallel and in opposition between said feeder and said network and said pulses having a phase such that when the potential on the feeder side is higher than the potential on the network side said triggers respectively will be energized on alternate half cycles when said switches are at a polarity which will permit conduction whereby power will flow from said feeders to said network, and such that when the potential on the network side is higher than on said feeder side the triggers respectively will be energized on alternate half cycles when said switches are at a polarity which will not permit conduction whereby power will then not flow from said network to said feeders, and a variable phase shifter connected to said transformer for phase advancing said trigger pulse to provide variable pulse phase control of said switches.

2. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer connected to said feeder for delivering trigger pulses to said switches having a predetermined phase with respect to the voltage on said feeder, said switches being connected in parallel and in opposition between said feeder and said network and said pulses having a phase such that when the potential on the feeder side is higher than the potential on the network side said triggers respectively will be energized on alternate half cycles when said switches are at a polarity which will permit conduction whereby power will flow from said feeders to said network, and such that when the potential on the network side is higher than on said feeder side the triggers respectively will be energized on alternate half cycles when said switches are at a polarity which will not permit conduction whereby power will then not flow from said network to said feeders, a pair of diodes, a pair of potentiometers, one of said diodes and potentiometers being connected in series with each of said switches for selectively varying the width of said trigger pulse, and a variable phase shifter connected to said transformer for phase advancing said trigger pulse to provide variable pulse phase control of said switches.

3. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer for delivering trigger pulses to said switches, said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network, and whereby when the potential on the network side is higher than on said feeder side the triggers respectively will be energized on alternate half cycles when said switches are at a polarity which will not permit conduction whereby power will then not flow from said network to said feeders, a variable phase shifter for phase advancing said trigger pulse to provide pulse control of said switches, an adjustable voltage transformer interposed between said phase shifter and said trigger transformer, a pair of diodes, and a pair of potentiometers, one of said diodes and potentiometers being connected in series with each of said switches for selectively varying the width of said trigger pulse.

4. A network protector in accordance with claim 3 wherein said diodes are cold cathode discharge tubes.

5. A network protector in accordance with claim 4 for insertion in a polyphase alternating current power distribution system wherein one of said network protectors is inserted in each phase.

6. A network protector in accordance with claim 4 wherein said phase shifter is an autotransformer.

7. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer for delivering trigger pulses to said switches, said switches being connected in parallel and in opposition between said feeder and said network whereby when the potential on the feeder side is higher than the potential of the network side said triggers respectively will be energized on alternate half cycles when said switches are at a polarity which will permit conduction whereby power will flow from said feeders to said network, and whereby when the potential on the network side is higher than on said feeder side the triggers respectively will be energized on alternate half cycles when said switches are at a polarity which will not permit conduction whereby power will then not flow from said network to said feeders, a pair of diode rectifiers, a pair of potentiometers, a pair of batteries, one of said diodes, potentiometers and batteries being connected in series with each of said switches for selectively varying the width of said trigger pulse, said batteries being of the opposite polarity in each series circuit for biasing said diodes.

8. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer for delivering trigger pulses to said switches, said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network, and whereby when the potential on the network side is higher than on said feeder side the triggers respectively will be energized on alternate half cycles when said switches are at a polarity which will not permit conduction whereby power will then not flow from said network to said feeders, a pair of diode rectifiers, a pair of potentiometers, a pair of batteries, one of said diodes, potentiometers and batteries being connected in series with each of said switches for selectively varying the width of said trigger pulse, said batteries being of the opposite polarity in each series circuit for biasing said diodes, and a variable phase shifter for phase advancing said trigger pulse to provide pulse control of said switches.

9. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer for delivering triggers pulses to said switches, said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network, and whereby when the potential on the network side is higher than on said feeder side the triggers respectively will be energized on alternate half cycles when said switches are at a polarity which will not permit conduction whereby power will then not flow from said network to said feeders, a pair of diode rectifiers, a pair of potentiometers, a pair of resistors, power supply means for supplying bias potential across said resistors, and one of said diodes, potentiometers and resistors being connected in series with each of said switches for selectively varying the width of said trigger pulse.

10. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and triggers which must be triggered by a pulse in order to conduct, each of said switches having associated therewith a transformer for delivering trigger pulses to said switches, said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network, and whereby when the potential on the network side is higher than on said feeder side the triggers respectively will be energized on alternate half cycles when said switches are at a polarity which will not permit conduction whereby power will then not flow from said network to said feeders, a pair of diode rectifiers, a pair of potentiometers, a pair of resistors, power supply means for supplying bias potential across said resistors, and one of said diodes, potentiometers and resistors being connected in series with each of said switches for selectively varying the width of said trigger pulse and a variable phase shifter for phase advancing said trigger pulse to provide pulse control of said switches.

References Cited

UNITED STATES PATENTS

| | | | |
|---|---|---|---|
| 3,323,017 | 5/1967 | Powell et al. | 317—33 X |
| 3,324,352 | 6/1967 | Horer | 317—33 X |
| 3,353,067 | 11/1967 | White | 317—33 |
| 3,373,290 | 3/1968 | Baker | 317—33 X |

JOHN F. COUCH, *Primary Examiner.*

R. V. LUPO, *Assistant Examiner.*

U.S. Cl. X.R.

307—51; 317—31, 33, 39, 43